US011200472B2

(12) United States Patent
Uemura

(10) Patent No.: US 11,200,472 B2
(45) Date of Patent: Dec. 14, 2021

(54) IDENTIFICATION APPARATUS, PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Ryosuke Uemura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/124,078

(22) Filed: Dec. 16, 2020

(65) Prior Publication Data

US 2021/0192299 A1 Jun. 24, 2021

(30) Foreign Application Priority Data

Dec. 19, 2019 (JP) ............................ JP2019-229385

(51) Int. Cl.
*G06K 15/00* (2006.01)
*G06N 20/00* (2019.01)
*G06K 15/02* (2006.01)

(52) U.S. Cl.
CPC ....... *G06K 15/4065* (2013.01); *G06K 15/002* (2013.01); *G06K 15/021* (2013.01); *G06N 20/00* (2019.01)

(58) Field of Classification Search
CPC ............ G06K 15/4065; G06K 15/002; G06K 15/021; G06N 20/00; H04N 1/00724; H04N 1/00726; H04N 1/00766
USPC ........................................................ 358/1.15
See application file for complete search history.

(56) References Cited

U.S. PATENT DOCUMENTS

| | | | | |
|---|---|---|---|---|
| 7,728,992 B2 * | 6/2010 | Yamamoto | B41J 11/009 358/1.13 |
| 2004/0113963 A1 * | 6/2004 | Tsujimoto | B41J 11/009 347/14 |

FOREIGN PATENT DOCUMENTS

| | | |
|---|---|---|
| JP | 2018-101848 A | 6/2018 |

* cited by examiner

*Primary Examiner* — Kent Yip
(74) *Attorney, Agent, or Firm* — Venable LLP

(57) ABSTRACT

An identification apparatus uses a sensor to sense a sheet, thereby obtaining a parameter concerning a characteristic of the sheet, and identifies a type of the sheet based on a result of inputting the parameter obtained by the sensor to an estimation model obtained by machine learning using a parameter of a sheet as input data and a type of a sheet as supervised data, the type used as supervised data corresponding to the parameter used as input data. The apparatus performs re-learning such that the identified type of the sheet based on a result of inputting the parameter obtained by the sensor as the input data to the estimation model becomes the type of the sheet represented by input information if the identified type of the sheet and the type of the sheet represented by the input information are different.

20 Claims, 11 Drawing Sheets

F I G. 5A
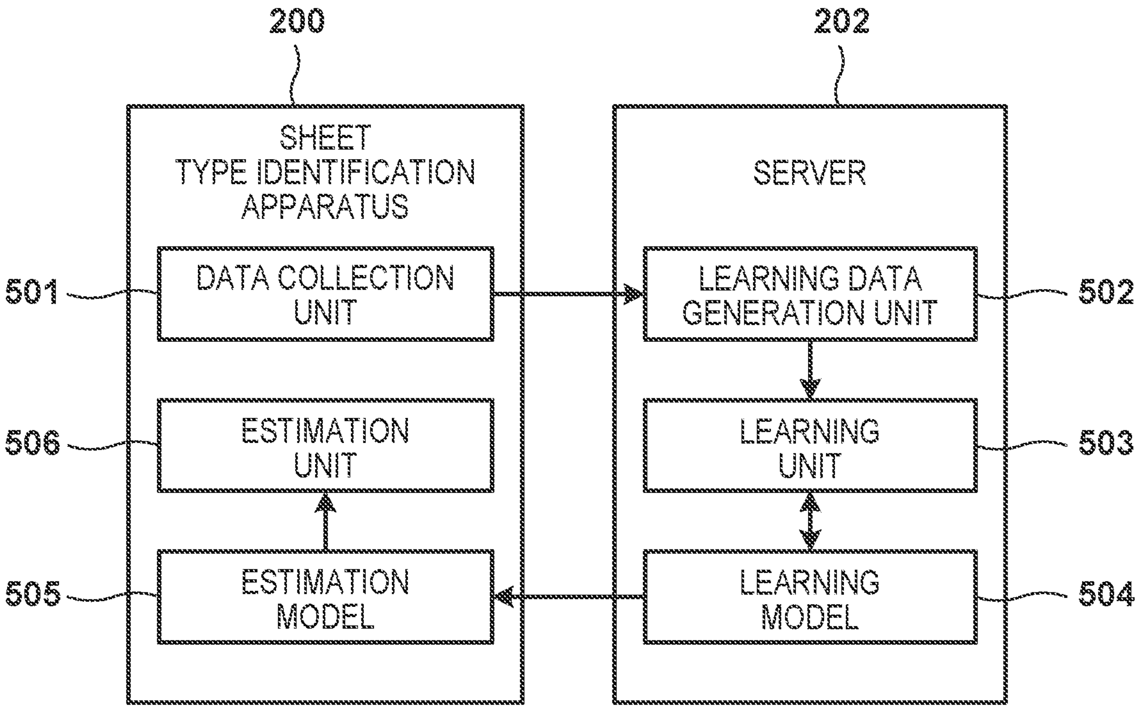
F I G. 5B
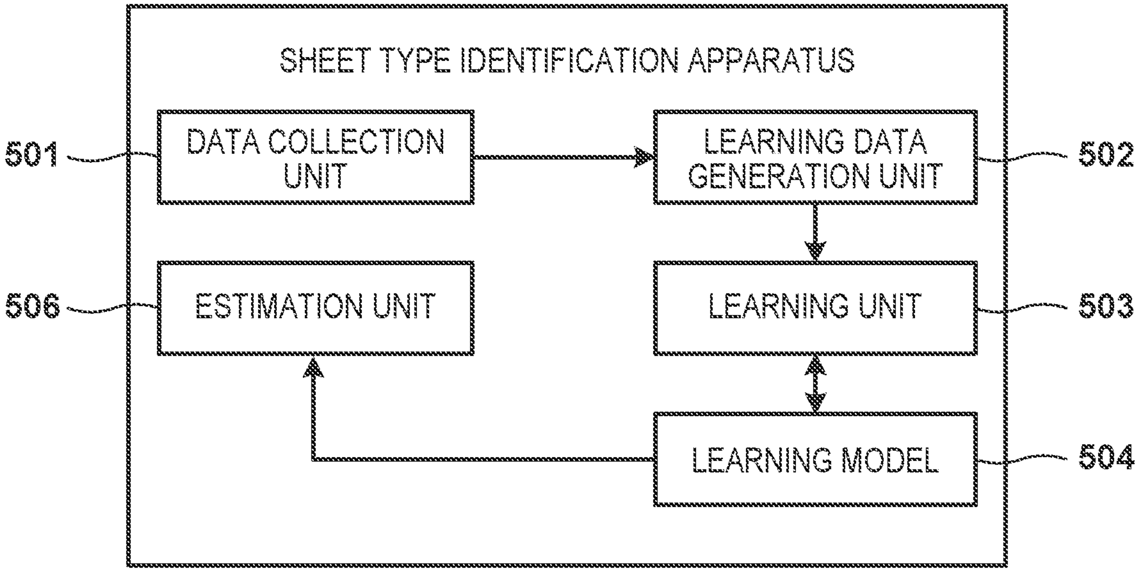

IDENTIFICATION APPARATUS, PROCESSING METHOD, AND NON-TRANSITORY COMPUTER-READABLE STORAGE MEDIUM

BACKGROUND OF THE INVENTION

Field of the Invention

The present invention relates to a sheet type identification technique.

Description of the Related Art

To implement clear printing, a printer using a mechanism configured to perform printing by making ink permeate a sheet to be printed, like an inkjet printer, performs appropriate ink output on a sheet basis. Hence, it is necessary to recognize the type of a sheet to be used in printing. Japanese Patent Laid-Open No. 2018-101848 discloses a method in which when conveying a sheet in a printer, the sheet is illuminated with light, and sheet type identification is performed based on output values obtained when a sensor receives reflected light and transmitted light and a separately measured paper thickness.

In the invention described in Japanese Patent Laid-Open No. 2018-101848, sheet type identification is performed based on collation between a value specified in advance and a value of reflected light/transmitted light or the like obtained using an optical sensor. In this processing, if a sensor output close to the characteristics of a plurality of sheet types is obtained, the specified sheet type may be different from the actual sheet type. In addition, a value that the optical sensor can obtain has a difference because of the individual differences between sensors or degradation caused by the user's use situation/use period. Hence, in some cases, sufficient identification accuracy cannot be obtained by the sheet type identification method using collation with a value specified in advance.

SUMMARY OF THE INVENTION

The present invention provides a technique of improving a sheet type identification capability.

According to one aspect of the present invention, there is provided an identification apparatus comprising: a sensor that senses a sheet, thereby obtaining a parameter concerning a characteristic of the sheet; and one or more computers for executing computer-readable instructions that, when executed by the one or more computers, cause the one or more computers to function as: an identification unit configured to identify a type of the sensed sheet based on a result of inputting the parameter obtained by the sensor to an estimation model obtained by machine learning using a parameter of a sheet as input data and a type of a sheet as supervised data, wherein the type of a sheet used as supervised data corresponds to the parameter of a sheet used as input data; an input unit configured to input information corresponding to the type of the sheet which is decided as the type of the sensed sheet, the parameter of the sensed sheet being obtained by the sensor; and an execution unit configured to execute re-learning for the estimation model using the parameter obtained by the sensor, wherein if the type of the sheet identified by the identification unit and the type of the sheet represented by the information input by the input unit are different, the execution unit performs the re-learning such that the type of the sheet identified by the identification unit based on a result of inputting the parameter obtained by the sensor as the input data to the estimation model becomes the type of the sheet represented by the information input by the input unit.

Further features of the present invention will become apparent from the following description of exemplary embodiments (with reference to the attached drawings).

BRIEF DESCRIPTION OF THE DRAWINGS

FIGS. 5A and 5B are block diagrams showing functional arrangement examples concerning machine learning in the processing system;

DESCRIPTION OF THE EMBODIMENTS

Figure 1:
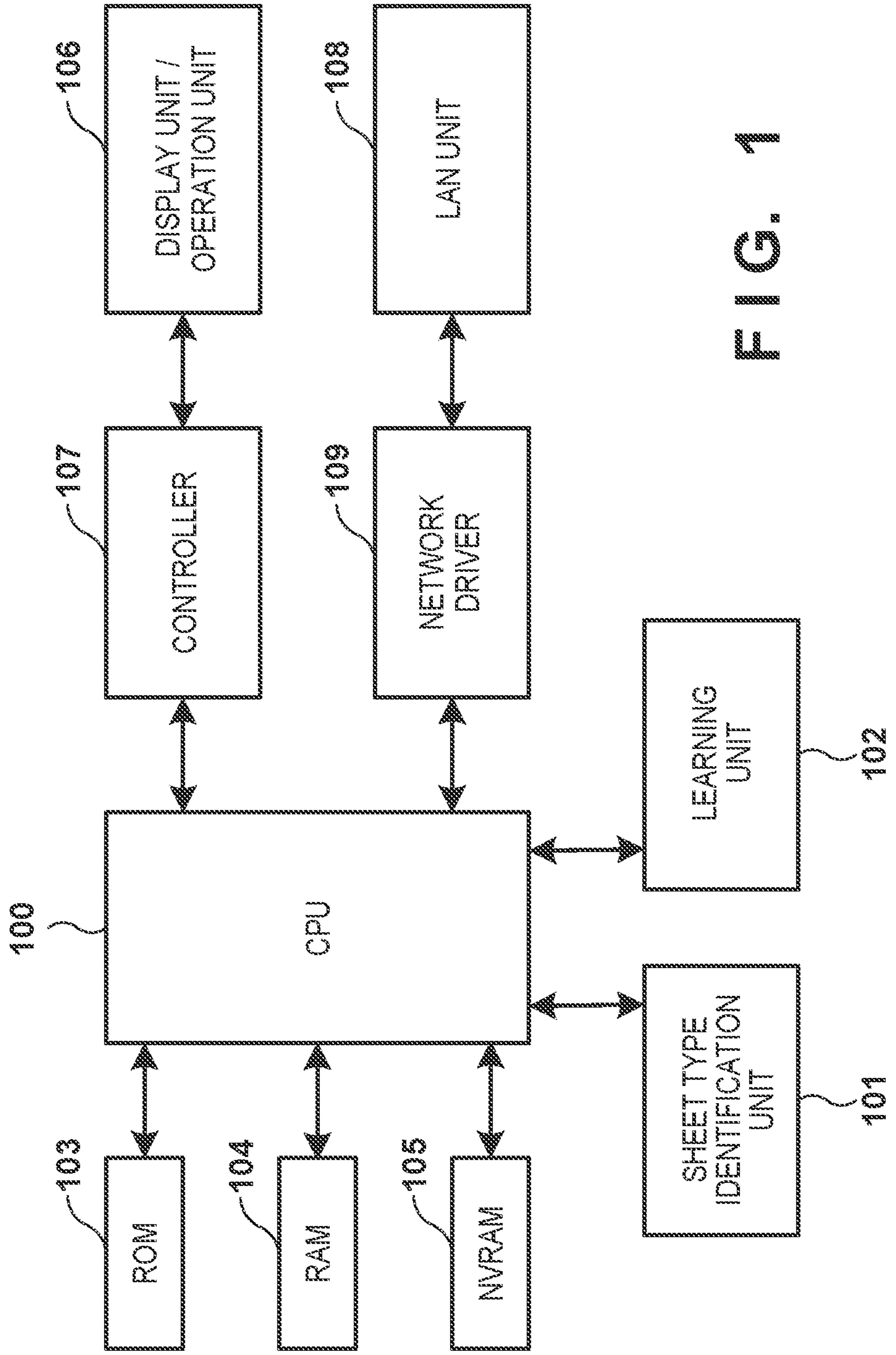
FIG. 1 is a block diagram showing the first arrangement example of a processing system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(System Arrangement)

Figure 2:
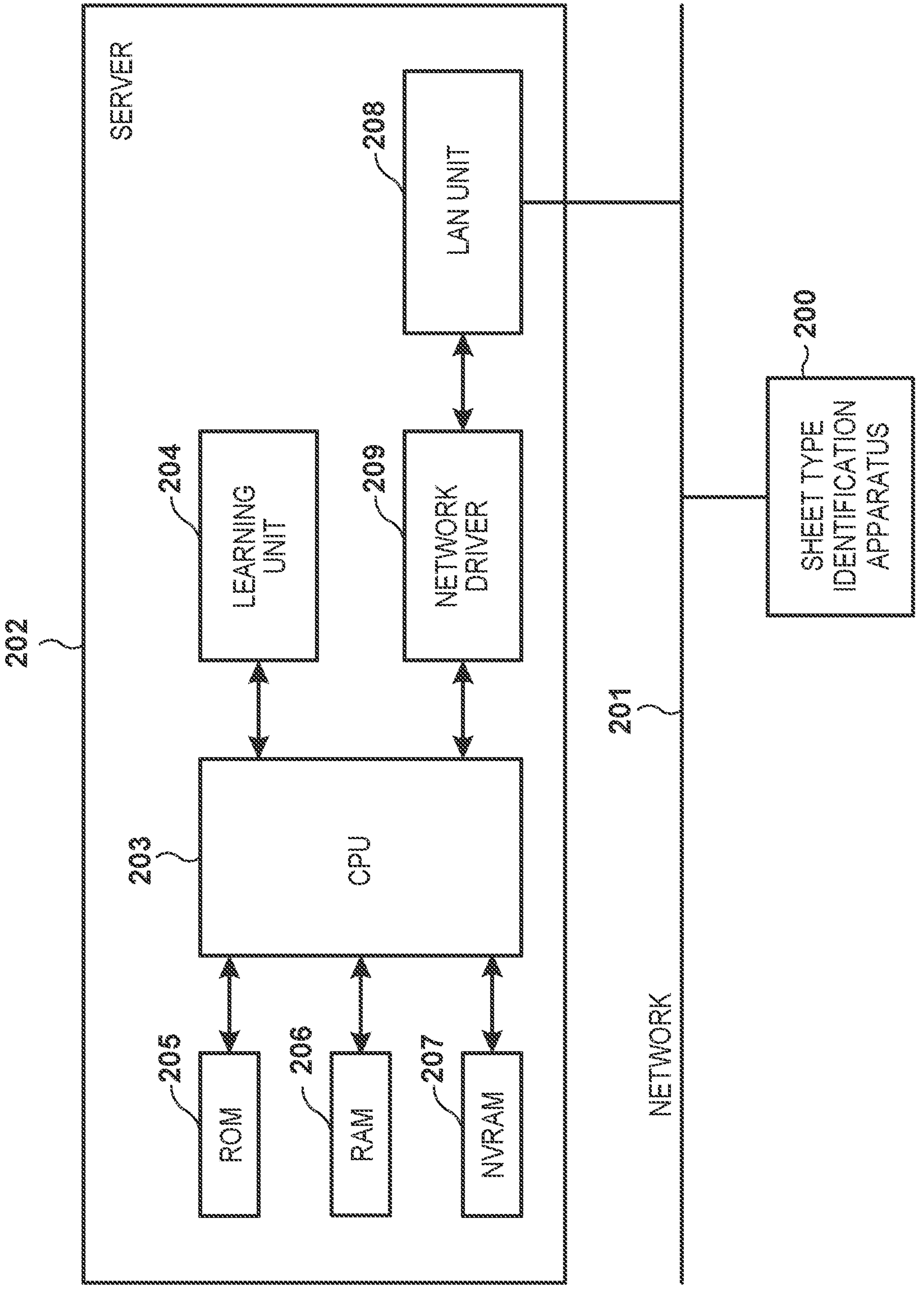
FIG. 2 is a block diagram showing the second arrangement example of the processing system.

An example of a system arrangement according to this embodiment will be described with reference to FIGS. 1 and 2. In this embodiment, machine learning is executed to identify a sheet type, and identification of a sheet type using an estimation model obtained by the machine learning is executed. As an example of the arrangement of a system for such processing, FIG. 1 shows an example in which machine learning and sheet type identification are executed by one apparatus, and FIG. 2 shows an example in which execution of machine learning and sheet type identification is shared by a plurality of apparatuses.

The arrangement of the apparatus in the system arrangement shown in FIG. 1 will be described. Note that this apparatus will be referred to as a sheet type identification apparatus hereinafter for the descriptive convenience, but may be configured to be able to execute processing other than sheet type identification. In this embodiment, the sheet type identification apparatus is provided in a printer. The sheet type identification apparatus identifies a sheet type based on a characteristic value concerning a sheet measured using a sensor included in the sheet conveyance mechanism of the printer, as will be described later. The sheet type identification apparatus includes, for example, a CPU 100, a sheet type identification unit 101, a learning unit 102, a ROM 103, a RAM 104, an NVRAM 105, a display unit/operation unit 106, a controller 107, a LAN unit 108, and a network driver 109. Note that ROM is an acronym for Read Only Memory, RAM is an acronym for Random Access Memory, and NVRAM is an abbreviation for Non Volatile RAM. In addition, LAN is an acronym for Local Area Network. The sheet type identification apparatus may be an apparatus that is provided independently of the printer and can communicate with the printer. A sensor may be provided in the sheet type identification apparatus.

The sheet type identification apparatus executes various kinds of control processing such as control of the entire apparatus and control of sheet type identification processing by, for example, executing a program stored in the ROM 103 or the like by the CPU 100. At this time, the RAM 104 can be used as a work memory in, for example, control. Data that should be held when the sheet type identification apparatus is powered off is held in the NVRAM 105 that is a nonvolatile RAM. The sheet type identification apparatus controls the sheet type identification unit 101 and the learning unit 102 by executing a control program stored in the ROM 103 by the CPU 100. In this case, the RAM 104 holds, for example, data of a result of measuring a sheet as a temporary record. The NVRAM 105 records various kinds of data necessary for maintenance of the sheet type identification apparatus and saves information concerning a sheet, which is used to identify a sheet type. The sheet type identification unit 101 executes sheet type identification processing and identifies the type of a sheet based on data of a result of measuring the sheet. The learning unit 102 executes machine learning to obtain an estimation model to be used for sheet type identification processing. The operations of the sheet type identification unit 101 and the learning unit 102 will be described later.

The sheet type identification apparatus displays information on a screen via, for example, the display unit/operation unit 106, and accepts a user operation. Note that display of information can be performed using not only screen display but also various kinds of interfaces such as a sound and a vibration. Acceptance of a user operation is executed via, for example, hardware such as a keyboard, a pointing device, or a touch pad. The display unit/operation unit 106 may be implemented using different pieces of hardware such as a display and a keyboard, or may be implemented by one piece of hardware such as a touch panel. The controller 107 converts, for example, information output by the CPU 100 into a format usable by the display unit/operation unit 106 to generate information presentable to the user, and outputs it to the display unit/operation unit 106. In addition, the controller 107 converts a user operation accepted by the display unit/operation unit 106 into a format processible by the CPU 100, and outputs it to the CPU 100. The execution operation and the setting operation of each function in the sheet type identification apparatus are executed via, for example, the display unit/operation unit 106 and the controller 107.

The sheet type identification apparatus is connected to a network via, for example, the LAN unit 108 and communicates with another apparatus. The network driver 109 extracts data to be handled by the CPU 100 from a signal received via the LAN unit 108, and also performs conversion of data output from the CPU 100 into a format to be sent to the network. Note that the LAN unit 108 can include an interface such as a socket for wired communication such as Ethernet® and a circuit for signal processing. The LAN unit 108 may include an antenna for wireless communication such as wireless LAN complying with the IEEE802.11 standard series and a circuit for signal processing. In place of the LAN unit 108, a communication unit for public wireless communication or short distance wireless communication may be provided. Note that when performing the operation of the sheet type identification apparatus via a remote user interface, a control instruction to the sheet type identification apparatus, set value obtaining, and processing result output can be performed via the LAN unit 108 and the network driver 109.

FIG. 2 shows an example of the arrangement of the system in a case in which the learning unit 102 is arranged outside the sheet type identification apparatus. In the example shown in FIG. 2, the system includes a sheet type identification apparatus 200 and a server 202. The sheet type identification apparatus 200 is connected to the server 202 via a network 201, obtains an estimation model that is the result of machine learning by a learning unit 204 in the server 202, and executes sheet type identification processing using the estimation model. Note that the server 202 can be a processing apparatus formed by a general-purpose computer including, for example, a CPU 203, a ROM 205, a RAM 206, an NVRAM 207, and the like. The server 202 controls machine learning processing in the learning unit 204 by, for example, executing a program stored in the ROM 205 by the CPU 203. The sheet type identification apparatus may include a GPU (Graphics Processing Unit) and control machine learning processing in the learning unit 204 using the GPU. The GPU can perform an efficient operation by performing parallel processing of a larger quantity of data. For this reason, when performing learning a plurality of times using a learning model, like deep learning, it is effective that processing is performed by the GPU. More specifically, when executing a learning program including a learning model, learning is performed by cooperatively executing an operation by the CPU 203 and the GPU. Note that an operation concerning processing of the learning unit 204 may be done only by the GPU. An estimation unit 506 and a learning unit 503 to be described with reference to FIGS. 5A and 5B may also use a GPU, like the learning unit 204. Note that the RAM 206 holds data to be used in learning as a temporary record when the server executes control. The NVRAM 207 records various kinds of data necessary for estimation model generation and saves information concerning a sheet, which is used to identify a sheet type. The server 202 can include a LAN unit 208 used to connect, for example, an external apparatus such as the sheet type identification apparatus 200. Note that the LAN unit 208 and a network driver 209 arranged between the LAN unit 208 and the CPU 203 are the same as the LAN unit 108 and the network driver 109 shown in FIG. 1.

Figure 3:
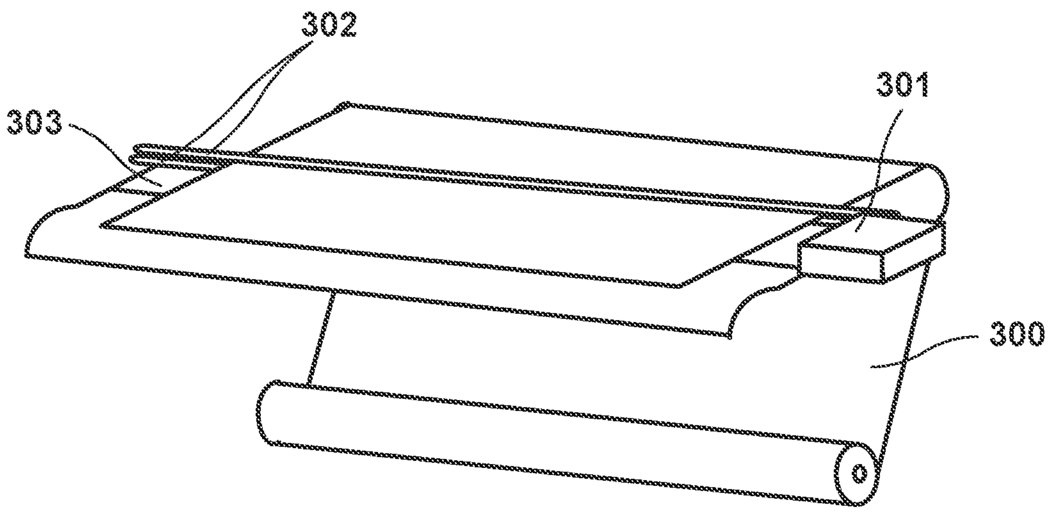
FIG. 3 is a view showing an example of the arrangement of the sheet conveyance mechanism of a printer.

FIG. 3 shows an example of the arrangement of the sheet conveyance mechanism of a printer. In FIG. 3, a sheet 300 that is identification target paper is attached. Note that in the example shown in FIG. 3, the sheet 300 is roll paper. However, the sheet 300 may be cut paper. The sheet 300 is sandwiched by conveyance rollers 302 from the upper and lower sides of the sheet. As the conveyance rollers 302 rotate, the sheet is conveyed. In addition, the sheet 300 is supported from the lower side by a platen 303. The sheet conveyance mechanism further includes a sensor 301, and a value obtained by the sensor 301 is used for sheet type identification processing. Note that the arrangement shown in FIG. 3 is merely an example, and, for example, sheet measurement can be performed by arranging the sensor 301 at an arbitrary position to which the sheet 300 before printing is conveyed.

Figure 4:
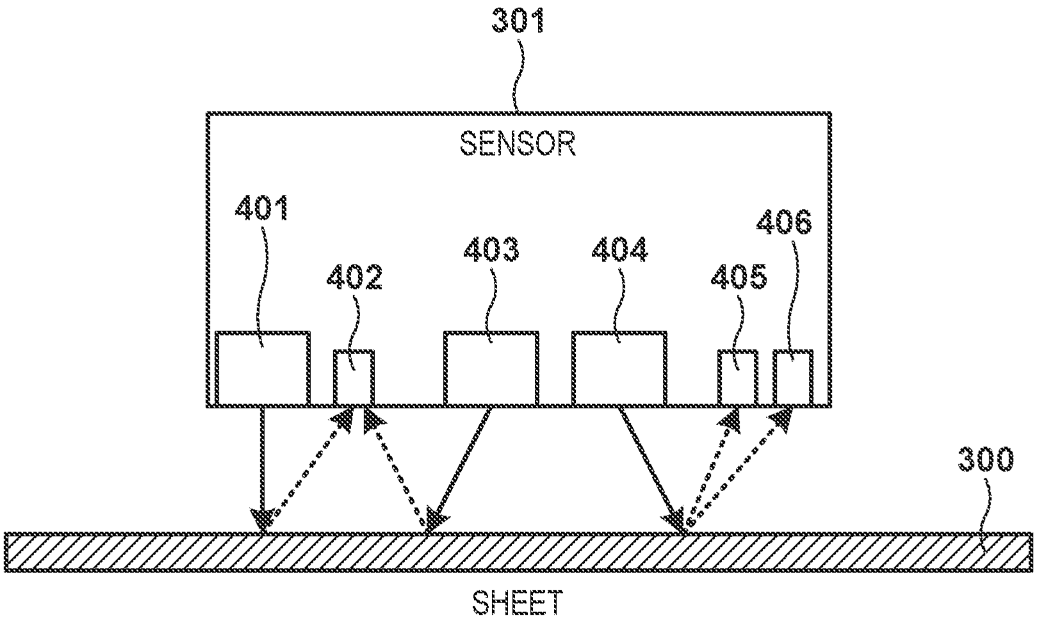
FIG. 4 is a view showing an example of the arrangement of a sensor.

FIG. 4 shows an example of the arrangement of the sensor 301. The sensor 301 includes a plurality of measurement mechanisms configured to obtain the value of a light amount (to be referred to as a "light amount value" hereinafter) necessary for identifying a sheet type. These measurement mechanisms need not always be mounted in one sensor and may be distributed to a plurality of sensors. The sensor 301 includes, as light emitting elements, for example, a first light emitting unit 401, a second light emitting unit 403, and a third light emitting unit 404. Note that these light emitting units can be, for example, LEDs (light emitting diodes). In addition, the sensor 301 includes, as light receiving elements, for example, a first light receiving unit 402, a second light receiving unit 405, and a third light receiving unit 406. Note that these light receiving units can be photodiodes.

The first light emitting unit 401 is, for example, a light source having an illumination angle in a first predetermined direction (for example, 90°) with respect to the surface (measurement surface) of the sheet 300. The first light receiving unit 402 receives, for example, reflected light generated when light with which the first light emitting unit 401 has illuminated the sheet 300 is reflected as light from the direction of a second predetermined angle (for example, 45°) with respect to the plane of the sheet 300. That is, the first light receiving unit 402 detects a diffused reflection component in reflected light generated when the illumination light from the first light emitting unit 401 is reflected by the sheet 300. The second light emitting unit 403 is a light source that emits light in a direction that intersects the surface (measurement surface) of the sheet 300 at a third predetermined angle (for example, 60°). The first light receiving unit 402 receives light from the third predetermined angle in reflected light generated when the illumination light from the second light emitting unit 403 is reflected by the sheet 300. That is, the first light receiving unit 402 detects a specular reflection component in reflected light generated when the illumination light from the second light emitting unit 403 is reflected by the sheet 300.

The third light emitting unit 404 is a light source having an illumination angle at a fourth predetermined angle (for example, 90°) with respect to the surface (measurement surface) of the sheet 300. Each of the second light receiving unit 405 and the third light receiving unit 406 receives reflected light generated when the illumination light from the third light emitting unit 404 is reflected by the sheet 300. Each of the second light receiving unit 405 and the third light receiving unit 406 receives light generated when light with which the third light emitting unit 404 has illuminated the sheet 300 is reflected. Each of the second light receiving unit 405 and the third light receiving unit 406 measures the distance between the sensor 301 and the sheet 300 based on the light receiving amount that changes depending on the distance between the sensor 301 and the sheet 300. For example, the incident angle of reflected light changes depending on the distance between the sensor 301 and the sheet 300. As a result, the light amounts obtained by the second light receiving unit 405 and the third light receiving unit 406 change. Because of the positional relationship between the second light receiving unit 405 and the third light receiving unit 406, the shorter the distance between the sensor 301 and the sheet 300 is, the larger the difference between the light amounts is. Hence, the distance between the sensor 301 and the sheet 300 can be specified based on the difference between the light amounts obtained by these light receiving units.

Note that in this embodiment, the sensor 301 measures reflected light. However, the sensor 301 may measure transmitted light. Alternatively, diffracted light generated when applying light to the edge of a sheet may be measured. In this embodiment, a case in which a parameter concerning the characteristic of a sheet is obtained by applying light to the sheet will be described. However, the present invention is not limited to this. For example, a sound wave or an ultrasonic wave may be used in place of light, and a parameter concerning a characteristic such as a temperature change that occurs when heated by a heater or the like may be obtained.

(Machine Learning)

In this embodiment, sheet type identification processing is executed by an estimation model obtained using machine learning. Functional arrangement examples concerning this processing will be described here with reference to FIGS. 5A and 5B. FIG. 5A shows an example in which as in the arrangement shown in FIG. 2, machine learning is performed in the server 202, a generated estimation model is notified to the sheet type identification apparatus 200, and the sheet type identification apparatus 200 executes sheet type identification processing using the estimation model. In this case, the sheet type identification apparatus 200 includes a data collection unit 501 configured to collect sheet data (in this embodiment, light amount values received by the above-described light receiving units) used to perform machine learning in the server 202, and the estimation unit 506 that identifies a sheet type. The estimation unit 506 performs sheet type identification using an estimation model 505 generated by the server 202. The server 202 includes a learning data generation unit 502 and the learning unit 503. The learning data generation unit 502 analyzes the sheet data (light amount values received by the above-described light receiving units) obtained by the data collection unit 501 of the sheet type identification apparatus 200. The learning unit 503 executes machine learning using the data analyzed by the learning data generation unit 502, and sequentially updates a learning model 504. The learning model 504 after the learning is completed is transmitted as the estimation model 505 to the sheet type identification apparatus 200.

FIG. 5B shows an example in which the sheet type identification apparatus singly performs learning and estimation, as in the arrangement shown in FIG. 1. In this case, the learning data generation unit 502, the learning unit 503, and the learning model 504 are provided in the sheet type identification apparatus. Note that in this system, since the learning model 504 need not be transferred from another apparatus to the sheet type identification apparatus, the estimation model 505 may be omitted. In this case, the sheet type identification apparatus repetitively updates the learning model 504. If it is judged that the learning model 504 can be used as the estimation model 505, the estimation unit 506 estimates a sheet type using the learning model 504 as the estimation model 505.

Figure 6:
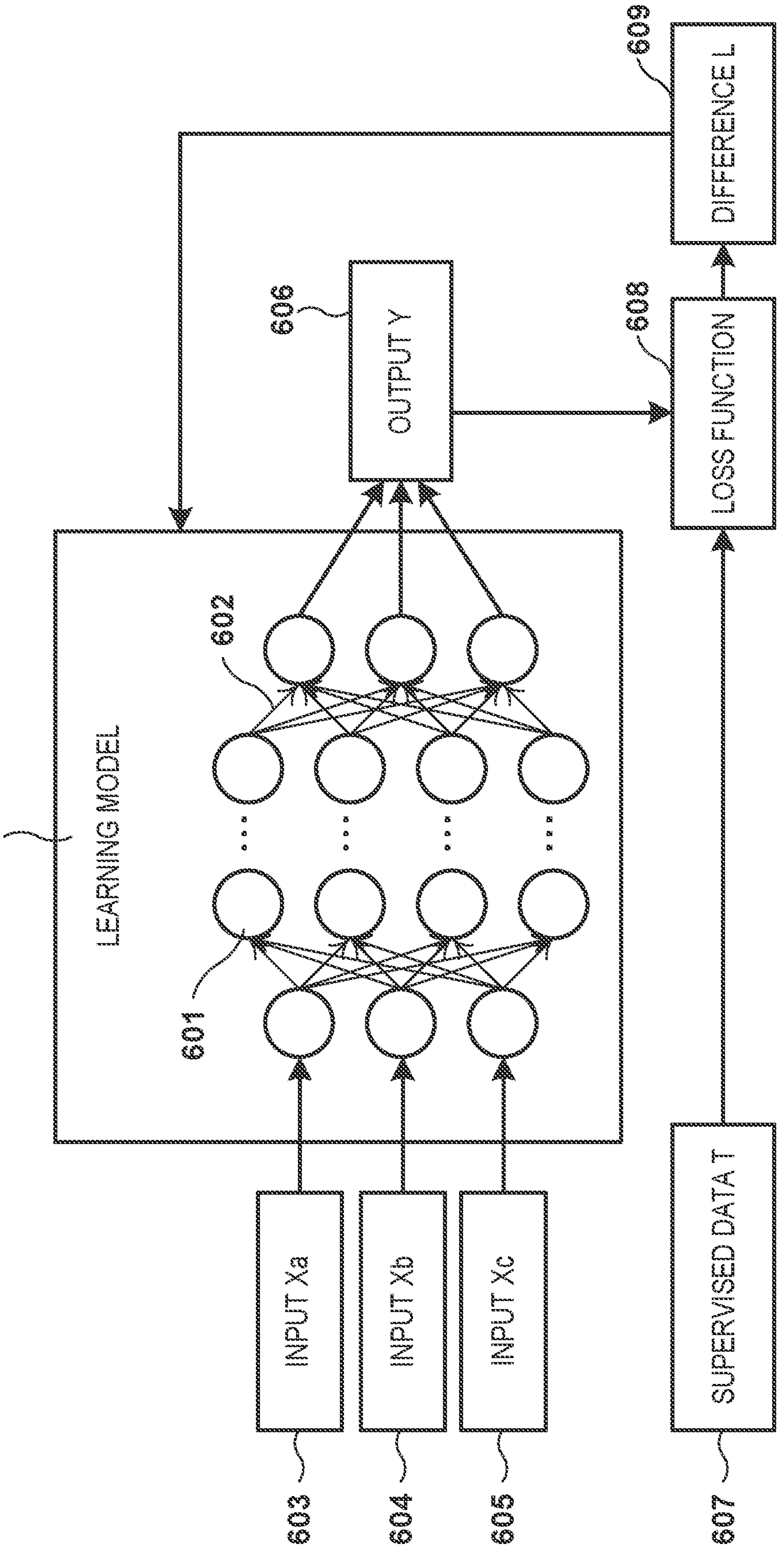
FIG. 6 is a view for explaining the arrangement of input/output when learning a learning model.

Note that in this embodiment, a neural network is used as the learning model 504. FIG. 6 shows the relationship between the learning model at the time of learning and input/output data. A learning model 600 includes many nodes 601, and the nodes 601 are associated with each other by branches 602 corresponding to weight coefficients. The weight coefficients corresponding to the branches are optimized, thereby performing classification of input data Xa 603 to input data Xc 605 and extraction of feature amounts. For example, the input data Xa 603 is the light amount value of the diffused reflection component obtained by the above-described first light receiving unit 402, and the input data Xb 604 is the light amount value of the specular reflection component obtained by the first light receiving unit 402. In addition, the input data Xc 605 is, for example, the distance between the sensor 301 and the sheet 300, which is specified by the third light emitting unit 404, the second light receiving unit 405, and the third light receiving unit 406. Note that these are merely examples, and various kinds of parameters obtained by the sensor can be used as input data. Additionally, for example, data that is necessary as input data in the diffused reflection component, the specular reflection component, and the distance between the sensor 301 and the sheet 300 may selectively be used. The input data is obtained in advance before learning of the learning model 600 is performed. When obtaining input data, the sensor 301 is arranged on the sheet 300. Since data obtained by the sensor 301 is assumed to vary due to the influence of a temperature, a humidity, and the like, input data can be obtained under various conditions. The sensor 301 is fixed to a point on the sheet 300, and obtains data at the position. Note that to efficiently change the data obtaining conditions, the positional relationship between the sensor 301 and the measurement point on the sheet 300 may be changed by conveying the sheet 300 by the rotation of the conveyance roller 302, and data may be obtained at a plurality of points.

When the input data are input to the learning model 600, output data Y 606 is output as a final calculation result. At the time of learning, supervised data T 607 is given as correct answer data of the recognition result of the input data Xa 603, the input data Xb 604, and the input data Xc 605. As for the input data, learning with a little bias can be performed by inputting the data of sheet types at random rather than by inputting input data of one sheet type in a certain order. In this embodiment, data representing a type of sheet is used as the supervised data T 607. When the output data Y 606 and the supervised data T 607 are given to a loss function 608, a difference L 609, of the recognition result by the learning model 600 at the current time, from a correct answer can be obtained. The weight coefficients corresponding to the branches between the nodes of the neural network in the learning model 600 are updated using a method such as back propagation such that the difference L 609 becomes small for a number of learning data. Back propagation is a well-known technique, and a description thereof will be omitted here. Note that in this embodiment, machine learning is performed using, for example, one of algorithms such as a nearest neighbor algorithm, a naive Bayes method, a decision tree method, and a support vector machine. Alternatively, deep learning for generating a feature amount to be learned or a weight coefficient corresponding to a branch by itself using a neural network may be used for machine learning. An algorithm other than these may be used.

Figure 7:
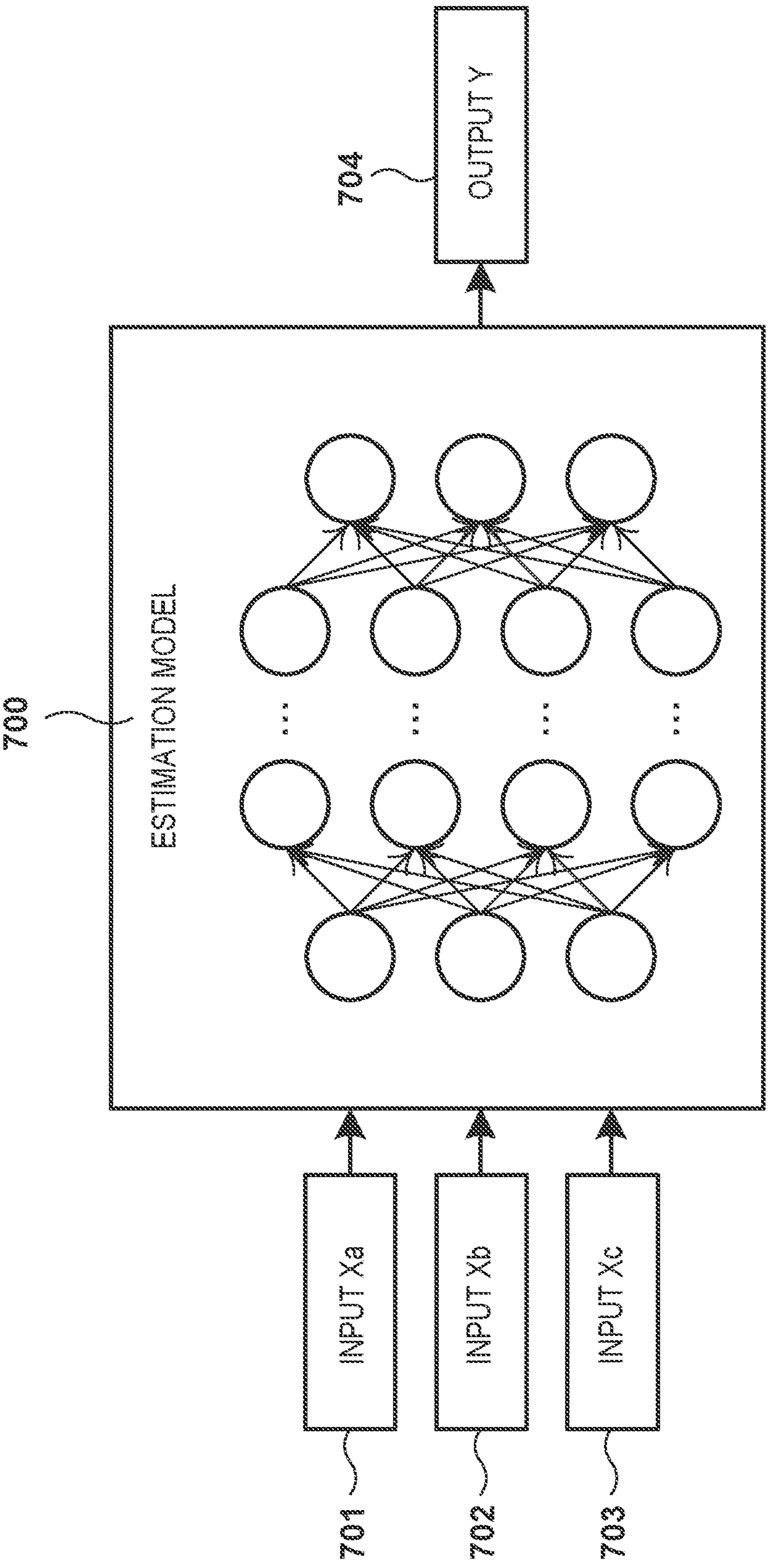
FIG. 7 is a view for explaining the arrangement of input/output when performing inference using an estimation model.

FIG. 7 shows the relationship between the estimation model and the input/output data at the time of identification according to this embodiment. An estimation model 700 is the learning model 600 that can be regarded as a model optimized by learning or a model that has sufficiently undergone learning. When input data Xa 701 to input data Xc 703 are input to the estimation model 700, output data Y 704 corresponding to these input data is output. In this embodiment, the output data Y 704 is data representing the type of a sheet. For example, the probability of each sheet type is specified by the estimation model 700, and a sheet type with the highest specified probability can be output as the output data Y 704. Note that a probability for each sheet type may be output as the output data Y 704. The input data Xa 701, the input data Xb 702, and the input data Xc 703 are input data to the estimation model 700, and correspond to the input data Xa 603, the input data Xb 604, and the input data Xc 605, respectively, which are input to the learning model 600. That is, for example, the input data Xa 701 is the light amount value of the diffused reflection component obtained by the above-described first light receiving unit 402, and the input data Xb 702 is the light amount value of the specular reflection component obtained by the first light receiving unit 402. In addition, the input data Xc 703 is, for example, the distance between the sensor 301 and the sheet 300, which is specified by the third light emitting unit 404, the second light receiving unit 405, and the third light receiving unit 406. Note that these are merely examples, and data of the same types as the input data used at the time of learning to obtain the estimation model 700 are used as the input data for inference by the estimation model 700.

To improve the accuracy of the estimation model 700, additional learning can be performed using the data used in inference. For example, re-learning can be performed using the input data Xa 701 to the input data Xc 703 used for inference as the input data Xa 603 to the input data Xc 605 for learning and the output data Y 704 as the supervised data T 607. In the re-learning, learning is performed anew including the combination of the input data and the supervised data used in the past learning. Hence, the system can be configured to obtain, for re-learning, input data and supervised data used in the past learning.

Figure 8:
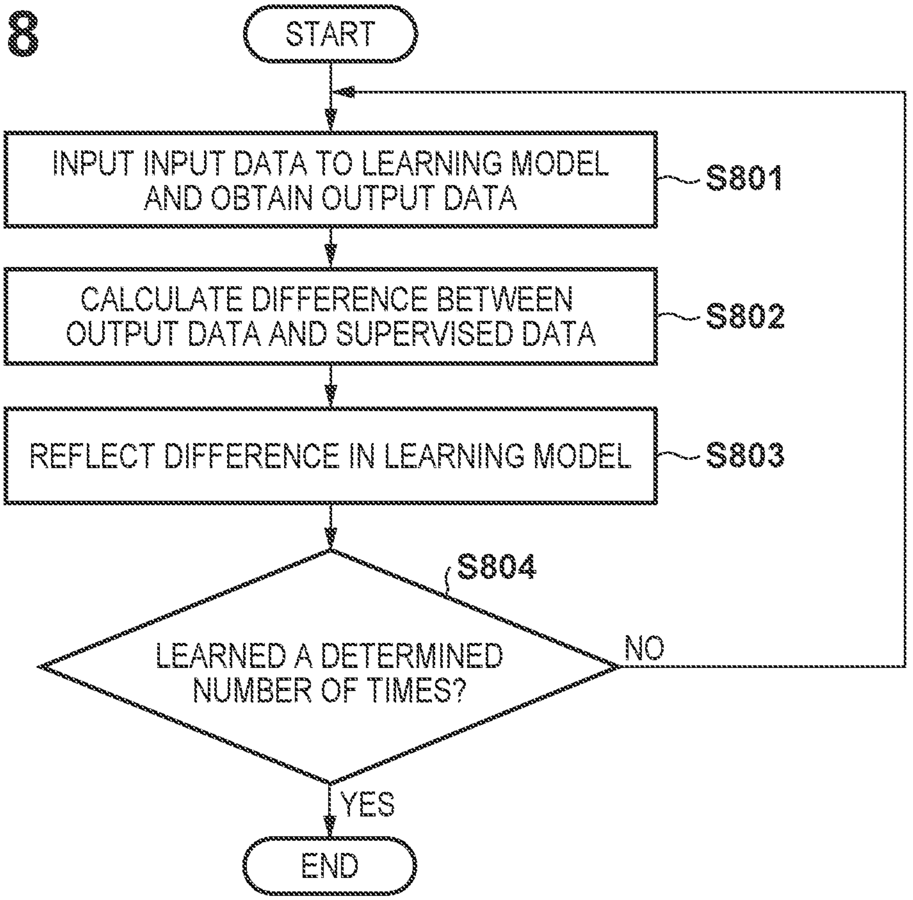
FIG. 8 is a flowchart showing an example of the procedure of processing at the time of learning of a learning model.

The procedure of processing at the time of learning of the learning model shown in FIG. 6 will be described with reference to FIG. 8. This learning is executed in advance by a learning executor before the user uses the sheet type identification apparatus. The learning executor can be, for example, a producer in an estimation model production process but may be the user himself/herself. Note that if the individual differences between sensors are not taken into consideration, in an arrangement as shown in FIG. 1, learning is performed in a sheet type identification apparatus included in one printer, and an estimation model obtained by this can be input to one or more other sheet type identification apparatuses. In an arrangement as shown in FIG. 2, learning is performed in another apparatus such as a server connected to a sheet type identification apparatus via a network, and an estimation model obtained by this may be input to the sheet type identification apparatus via the network.

This processing is started when, for example, the learning executor such as the producer of the estimation model performs a learning start operation via the user interface of the sheet type identification apparatus or an apparatus for executing learning, such as a server. A description will be made below assuming that the sheet type identification apparatus executes this processing. However, another apparatus may execute the processing. First, the sheet type identification apparatus inputs input data to the learning model, and obtains output data (step S801). The learning executor, for example, prepares one or a plurality of printers having the same function as in the above-described embodiment, sets a sheet to be learned, obtains input data by the sensor 301, and inputs the data to the learning model, thereby executing learning. At the time of learning, data obtained by measuring a sheet by the sensors 301 in a plurality of printers prepared for estimation model production may be input as input data to one learning model, thereby executing learning.

Next, the sheet type identification apparatus calculates a difference using the output data obtained in step S801 and supervised data corresponding to the input data (step S802). If the difference is sufficiently small for many input data, it is determined that sufficient identification performance can be obtained. That is, it is possible to discriminate, by the magnitude of the difference, the level of identification performance held by the current learning model. Next, the sheet type identification apparatus reflects the difference in the weight coefficients and the like of the learning model (step S803). By this processing, the identification performance of the learning model can be improved. Learning of the learning model is performed by gradually correcting the weight coefficients. The number of times of learning can be decided in advance by the learning executor. In this case, the sheet type identification apparatus determines whether learning has been executed the determined number of times (step S804). Upon determining that learning has not been executed the determined number of times (NO in step S804), the sheet type identification apparatus returns the process to step S801 to repeat the learning. On the other hand, upon determining that learning has been executed the determined number of times (YES in step S804), the sheet type identification apparatus ends the learning. Note that the determination of step S804 may be performed by confirming a learning completion state. For example, the learning executor may observe the difference, and determine that the value of the difference is stable, thereby completing the learning. Note that determining whether the value of the difference has stabilized may be automatically done by the sheet type identification apparatus. For example, the sheet type identification apparatus may calculate, for differences obtained in a predetermined number of times of most recent learning, an average value or a difference value from a preceding difference, and if the absolute value of the difference value never exceeds a predetermined value, determine that the value of the difference has stabilized. Upon determining that the difference has not stabilized yet, the sheet type identification apparatus returns the process to step S801, and repeats the learning. Upon determining that the difference has stabilized, the learning can be ended.

Figure 9:
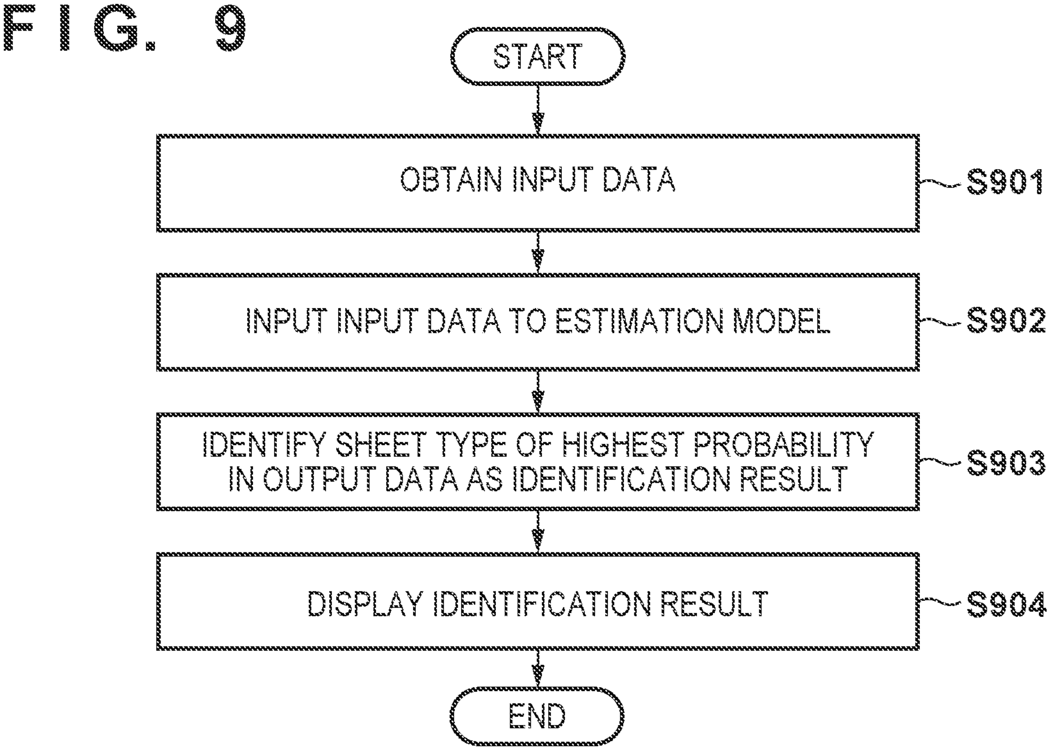
FIG. 9 is a flowchart showing an example of the procedure of processing at the time of inference using an estimation model.

Processing at the time of inference using an estimation model will be described next with reference to FIG. 9. This processing is executed when the sheet type identification apparatus accepts, for example, a sheet type identification processing start instruction from the user via a user interface. Alternatively, a sheet is conveyed in the printer before printing or at the time of printing, and the processing shown in FIG. 9 can be executed in accordance with the sensor output at the time of conveyance. In this processing, first, the user sets the sheet of the sheet type identification target in the printer (sheet type identification apparatus). The sheet type identification apparatus obtains input data from the sensor (step S901), and inputs the obtained input data to the estimation model, thereby obtaining output data (step S902). The output data obtained here is, for example, a value representing the probability that the identification target sheet is a certain sheet type. Hence, the sheet type identification apparatus selects, as the identification result, the sheet type of the highest probability in the output data (step S903). Finally, the sheet type identification apparatus displays the identification result on the display unit/operation unit 106 (step S904), and ends the processing.

Figure 10:
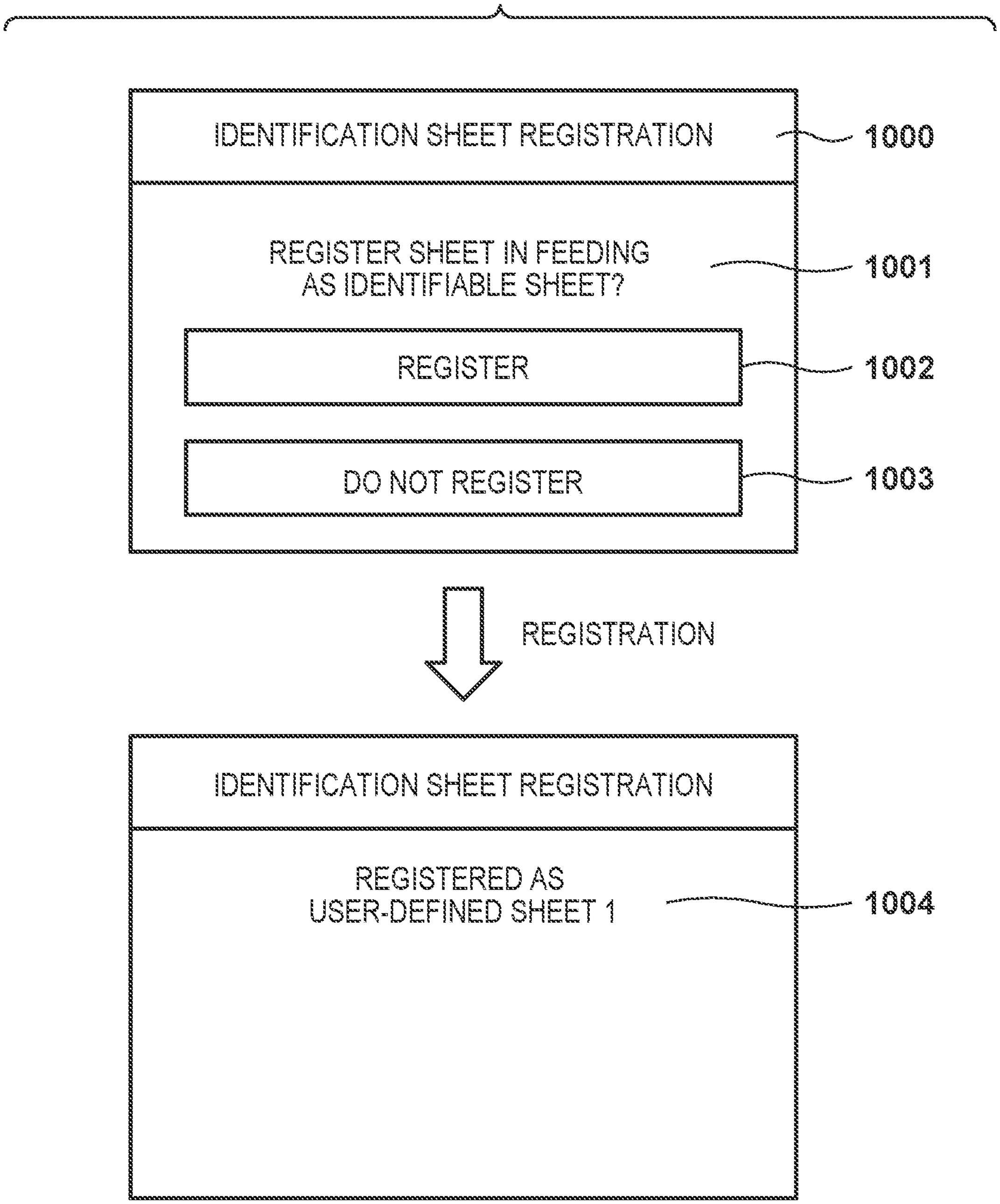
FIG. 10 is a view showing an example of an input screen configured to register a sheet type as an identification target.

The sheet type identification apparatus cannot identify a sheet that is not registered in advance as an identifiable sheet. Hence, the sheet type identification apparatus may display, for example, an identification sheet registration screen 1000 as shown in FIG. 10 on the display unit/operation unit 106 and accept a user operation for identifiable sheet registration. The identification sheet registration screen 1000 is displayed when, for example, sheet type identification processing as shown in FIG. 9 is performed, and the sheet cannot be identified in step S903. The identification sheet registration screen 1000 includes, for example, a message area 1001 that inquires of the user whether to register the sheet set in the sheet type identification apparatus as an identifiable sheet and buttons 1002 and 1003 that accept user selection concerning whether to register. If the user selects the button 1002, the sheet type identification apparatus registers the currently set sheet as the sheet of the identification target, and learns the sheet to be identified later. The sheet type identification apparatus changes the screen display to a screen 1004 including a message that notifies the user that the currently set sheet is registered as the sheet of the identification target. On the other hand, if the user selects the button 1003, the sheet type identification apparatus does not register the currently set sheet as the sheet of the identification target, and changes the screen display to a predetermined screen such as an idle screen.

Figure 11:
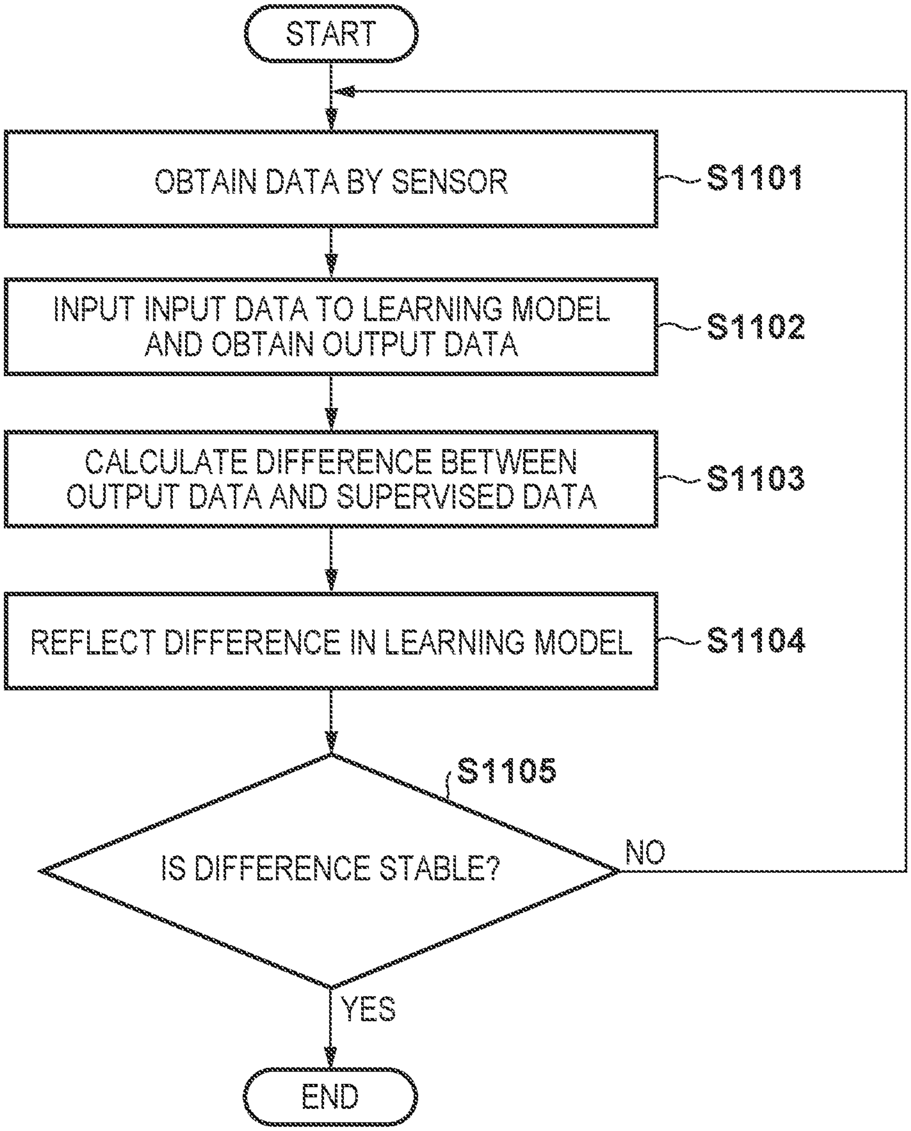
FIG. 11 is a flowchart showing an example of the procedure of processing when a sheet type as an identification target is registered.

The procedure of processing of learning executed when the user selects the button 1002, and the current set sheet is registered as the sheet of the identification target will be described here with reference to FIG. 11. In this processing, first, the sensor 301 of the sheet type identification apparatus obtains input data to be used for learning (step S1101). For example, the conveyance rollers 302 convey the sheet 300 set in the sheet type identification apparatus to a position at which sheet data can be obtained. The sensor 301 is moved to a position at which the characteristic of the sheet can be measured, and each of a diffused reflection component, a specular reflection component, and the distance between the sensor 301 and the sheet 300 is obtained once. When the data are obtained by the sheet type identification apparatus, in the sheet type identification apparatus or the learning unit of the server, the obtained data are input to the learning model as input data, and output data is obtained (step S1102). In the learning unit, the difference between the output data and the supervised data is calculated (step S1103), and the difference is reflected in the weight coefficients of the learning model, and the like (step S1104). Here, as indicated by the screen 1004 in FIG. 10, a sheet name such as "user-defined sheet 1" that is defined such that the user can specify it is used as the supervised data. After that, it is determined, based on the difference between the supervised data and the output data output by the learning model, whether to complete the learning (step S1105). For example, the sheet type identification apparatus may calculate, for differences obtained in a predetermined number of times of most recent learning, an average value or a difference value from a preceding difference, and if the absolute value of the difference value never exceeds a predetermined value, determine that the value of the difference has stabilized. Upon determining that the difference has not stabilized yet (NO in step S1105), the sheet type identification apparatus returns the process to step S1101, and repeats the learning. Upon determining that the difference has stabilized (YES in step S1105), the learning can be ended. Note that if the difference has not stabilized yet, for example, the positional relationship between the sensor 301 and the currently set sheet 300 is changed from the positional relationship at the preceding time of input data obtaining, input data is obtained again. That is, by changing the positional relationship between the sheet 300 and the sensor 301, a plurality of input data are obtained, and the processing shown in FIG. 11 can be executed based on the input data. However, the present invention is not limited to this, and the sheet type identification apparatus may prompt the user to set another sheet of the same type. Execution of the learning shown in FIG. 11 may be inhibited until a predetermined number of input data are collected for the sheet of the same type. When the processing shown in FIG. 11 is ended, the sheet conveyed to obtain data and the sensor arranged on the sheet can be returned to the standby positions. In addition, the first learning may be executed using data obtained in step S901 of FIG. 9.

Figure 12:
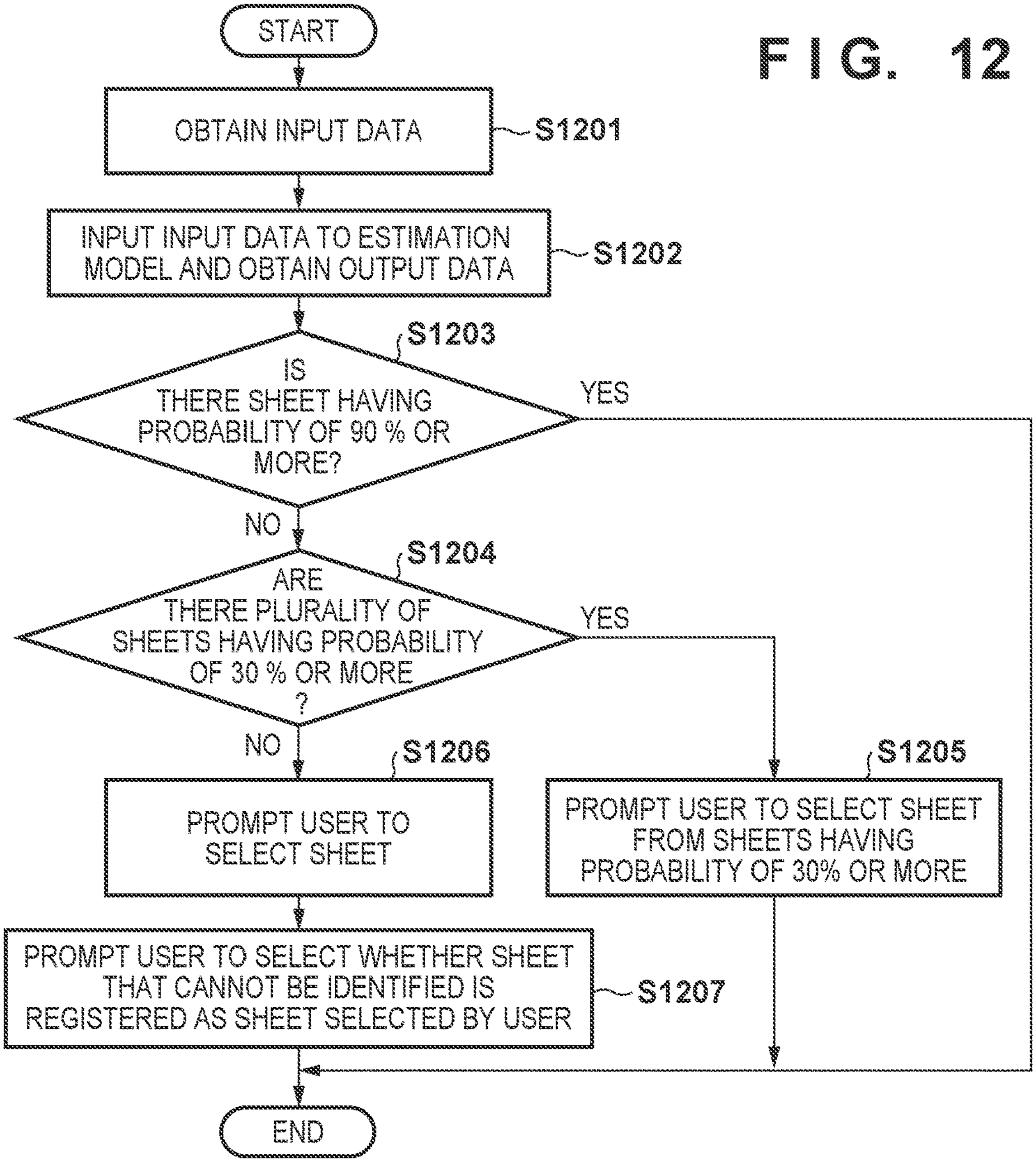
FIG. 12 is a flowchart showing an example of the procedure of sheet type identification processing.

Even if the estimation model obtained in the above-described way is used, in some cases, at least some sheets cannot be identified at a sufficient accuracy. For example, if the sheet type of the highest probability is output by a method as shown in FIG. 9, it may be assumed that the probability is not sufficiently high. For this reason, when the probability of a currently set sheet, of each of the sheet types of identification targets, is output by an estimation model, a user operation is accepted in accordance with the output, and a final identification result can be output. FIG. 12 shows an example of the procedure of processing in this case.

Processing shown in FIG. 12 is executed when the sheet type identification apparatus accepts a sheet type identification processing start instruction from the user via a user interface. Alternatively, a sheet is conveyed in the printer before printing or at the time of printing, and the processing shown in FIG. 12 can be executed in accordance with the sensor output at the time of conveyance. In this processing, first, the user sets the sheet 300 of the sheet type identification target in the printer (sheet type identification apparatus). The sheet type identification apparatus conveys the sheet 300 by the conveyance rollers 302 to a position at which data can be obtained by the sensor 301, and moves the sensor 301 onto the sheet 300. After that, using the sensor 301, the sheet type identification apparatus obtains, as input data, a diffused reflection component, a specular reflection component, and data representing the distance between the sensor 301 and the sheet 300, as described above (step S1201). The sheet type identification apparatus inputs the obtained data as input data to the estimation model, and obtains output data representing the probability for a sheet type (step S1202). For example, if the sheet types of identification targets are three types, that is, plain paper, glossy paper, and semi-glossy paper, output data can be output in an expression form such as plain paper: 70%, glossy paper: 20%, and semi-glossy paper: 10%. In this embodiment, probabilities can be output such that the sum of all the probabilities becomes 100%. The sheet type identification apparatus determines whether a sheet having a probability of 90% or more exists in the output data (step S1203). If a sheet having a probability of 90% or more exists (YES in step S1203), it can be said that the sheet type can be specified by the estimation model. Hence, the sheet type identification apparatus automatically selects the sheet type as the final result, and ends the processing.

On the other hand, if a sheet having a probability of 90% or more does not exist (NO in step S1203), the sheet type identification apparatus determines next whether a plurality of sheets each having a probability of 30% or more exist (step S1204). Upon determining that a plurality of sheets each having a probability of 30% or more exist (YES in step S1204), the sheet type identification apparatus displays the sheets each having a probability of 30% or more on the display unit/operation unit 106 to accept user selection of a correct sheet type (step S1205). Screen display here will be described later with reference to FIG. 13. In this case, via the screen displayed on the display unit/operation unit 106, the sheet type identification apparatus accepts user selection of a correct sheet from the sheets displayed on the screen. If user selection is accepted, the sheet type identification apparatus ends the processing. On the other hand, upon determining that only one or no sheet having a probability of 30 or more exists (NO in step S1204), the sheet type identification apparatus prompts the user to select a sheet from all sheet types (step S1206). For this purpose, the sheet type identification apparatus can display, for example, all sheet types in a list, display a screen configured to accept user selection on the display unit/operation unit 106, and accept user selection. After the user selection is accepted, the sheet type identification apparatus displays, on the display unit/operation unit 106, a screen configured to accept a user operation of registering, as a sheet selected by the user, a sheet that cannot be identified, and accepts the user operation (step S1207). Screen display here will be described later with reference to FIG. 14. After user selection in step S1207 is accepted, the sheet type identification apparatus ends the processing. Note that the thresholds such as "90%" and "30%" in steps S1203 and S1204 are merely examples, and may appropriately be changed in accordance with, for example, the use feeling of the user or the accuracy of sheet type identification processing.

Figure 13:
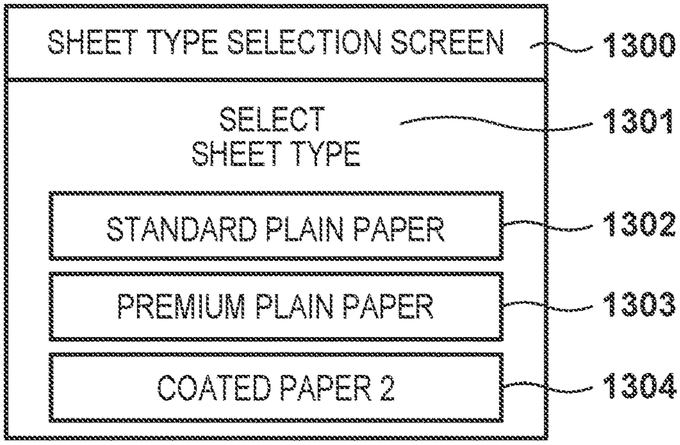
FIG. 13 is a view showing an example of a screen that prompts a user to select a set sheet.

FIG. 13 shows an example of a screen 1300 displayed in step S1205 of FIG. 12. On the screen 1300, as described above, sheet types 1302 to 1304, each determined to have a probability of 30% or more when input data obtained by the sensor 301 are input to the estimation model, are displayed in a list. The example of FIG. 13 shows a case in which it is determined that each of "standard plain paper", "premium plain paper", and "coated paper 2" has a probability of 30% or more. The screen 1300 may include a message 1301 that prompts the user to select one type from the list. If, for example, "premium plain paper" is selected on the screen 1300, the sheet type identification apparatus selects the selected "premium plain paper" as the final result, and ends the processing.

Figure 14:
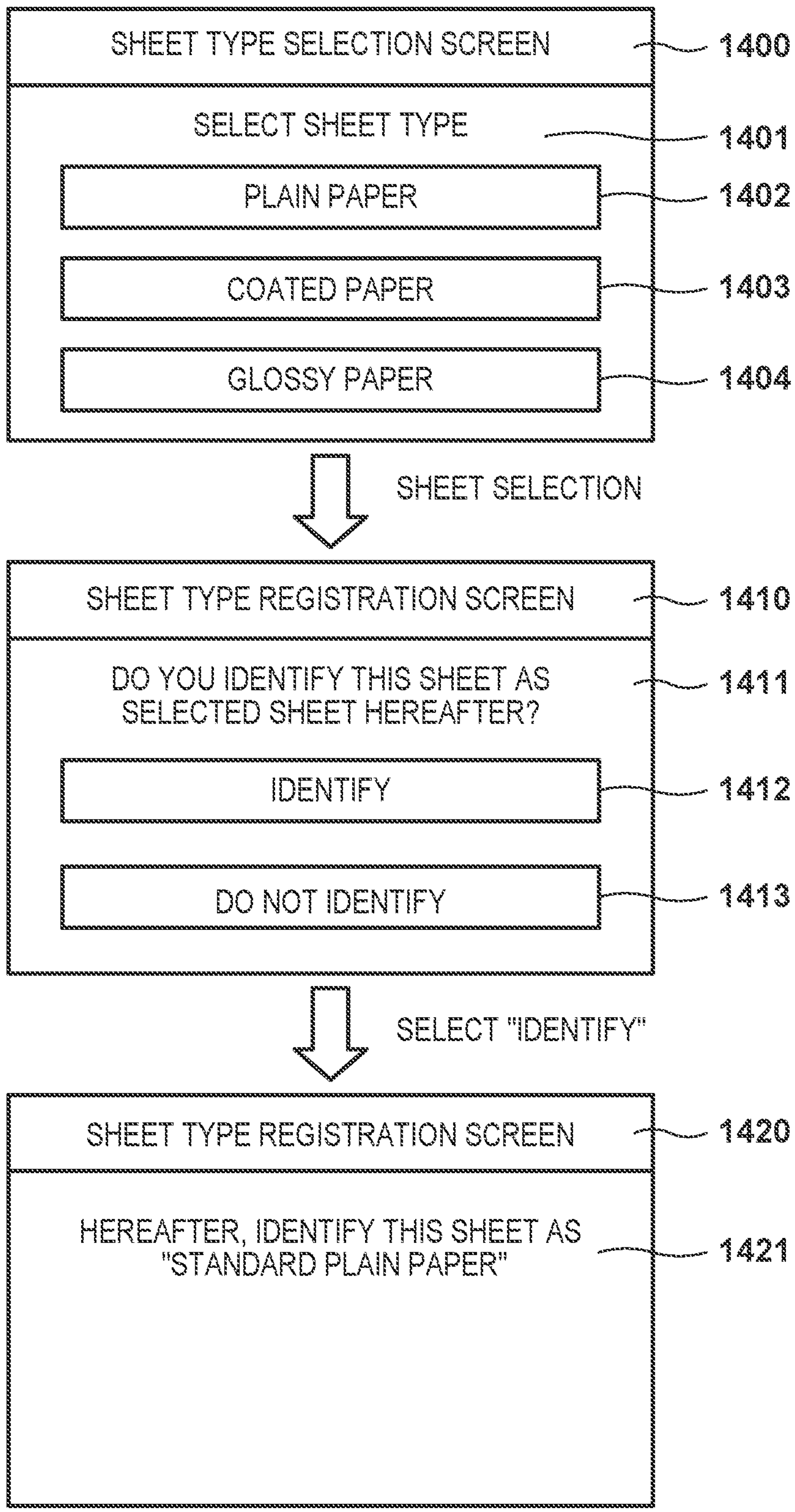
FIG. 14 is a view showing an example of a screen that prompts a user to select a set sheet and select necessity/non-necessity of registration.

FIG. 14 shows an example of a screen 1400 displayed in step S1206 of FIG. 12. The screen 1400 can be displayed when the number of sheets each determined to have a probability of 30% or more, is one or zero when input data obtained by the sensor 301 are input to the estimation model, as described above. In this case, a message 1401 configured to prompt the user to select a sheet type, and buttons that allow the user to select all sheets of identification targets of the sheet type identification apparatus are displayed. Note that if there are many selectable sheet types, broad categories can be displayed, like a plain paper button 1402, a coated paper button 1403, and a glossy paper button 1404 in FIG. 14. When the user selects one broad category, detailed categories in the broad category are displayed. The user selects a sheet type from these, thereby setting the sheet type. However, these are merely examples, and the selectable sheet types may be displayed in a list. For example, for the category of plain paper, detailed categories such as "standard plain paper" and "premium plain paper" may selectably be displayed. Note that at this time, if the sheet types that should be displayed cannot fit in one screen, the candidates of a number of sheet types may be displayed using, for example, a scroll bar. Note that a sheet of a new identification history may be displayed in high order. A sheet of a high probability may be displayed in high order. In the screen 1400 shown in FIG. 14, when, for example, the user selects the plain paper button 1402, more detailed categories such as "standard plain paper" and "premium plain paper" are displayed and the user may be prompted to further select. Here, "standard plain paper" is selected.

In accordance with the user selection, the sheet type identification apparatus displays a sheet type registration screen 1410 on the display unit/operation unit 106. The sheet type registration screen 1410 includes a message 1411 that prompts the user to select whether to identify the currently set sheet type as a selected sheet type (in this example, "standard plain paper") later. In addition, the sheet type registration screen 1410 includes an "identify" button 1412 and a "do not identify" button 1413, which are configured to accept the selection. If the user selects the "identify" button 1412, the sheet type identification apparatus displays a screen 1420 including a message 1421 representing that a sheet having the same characteristic measurement value as the measurement value of the currently set sheet is identified as a sheet type selected by the user. When the "identify" button 1412 is selected, the sheet type identification apparatus performs the processing shown in FIG. 11, thereby performing learning such that a sheet having the measurement value of the currently set sheet is identified as a sheet type selected by the user. Then, after the elapse of a predetermined time, the sheet type identification apparatus changes the screen display to an idle screen. On the other hand, if the "do not identify" button 1413 is selected by the user, the sheet type identification apparatus changes the screen display from the sheet type registration screen 1410 to an idle screen.

Note that the sheet type identification apparatus may perform re-learning for the estimation model using the light amount value obtained by the sensor 301 as input data and also using the sheet type that the user has selected in step S1205 or S1206 of FIG. 12 as supervised data. This can further improve the identification accuracy. Also, if one sheet type having a probability of 30% or more exists in step S1206, a screen showing the one sheet type may be displayed to allow the user to determine whether the sheet type is correct. As a result, if the sheet type is not correct, screen display as shown in FIG. 14 can be done. On the other hand, if the sheet type is correct, re-learning for the estimation model may be performed using the sheet type as supervised data.

As described above, the sheet type identification apparatus according to this embodiment uses an estimation model obtained by machine learning using, as input data, the light amount of light detected by illuminating a sheet with light and detecting reflected light or transmitted light and also using the type of the sheet at that time as supervised data. That is, a sheet type is identified using the estimation model learned to determine the sheet type corresponding to the input data by learning concerning a number of sheets. This makes it possible to accurately identify a sheet type in a variety of types of sheets.

In addition, when re-learning for the estimation model is performed, a sheet that was not previously an identification target can also be added as an identification target. It is therefore possible to execute sheet identification even in a case in which a new sheet is developed. If the obtained light amount value changes due to an individual difference between the sensor 301 used to generate the estimation model and the sensor 301 provided in the printer, the sheet type identification apparatus may output a sheet type different from the sheet type set by the user. Even in this case, when re-learning is performed, the sheet type set by the user can correctly be identified.

An example in which re-learning is performed if an unregistered sheet type or a sheet type determined to have a probability less than 90% in sheet type identification processing is selected has been described above. However, the present invention is not limited to this, and re-learning may be performed even in a case in which a sheet type determined to have a probability of 90% or more is selected. In this case, re-learning is performed by executing the processes of steps S1102 to S1104 of FIG. 11 using the output data obtained in step S1202 of FIG. 12 and the decided sheet type as supervised data.

Note that in the above-described example, an example in which when a sheet is conveyed in a printer, the type of the sheet is identified has been described. However, the present invention is not limited to this. For example, the above-described sheet type identification apparatus can also be applied not only to a sheet for printing but also to an arbitrary sheet-shaped object.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-229385, filed Dec. 19, 2019, which is hereby incorporated by reference herein in its entirety.

What is claimed is:

1. An identification apparatus comprising:

a sensor that senses a sheet, thereby obtaining a parameter concerning a characteristic of the sheet; and one or more computers for executing computer-readable instructions that, when executed by the one or more computers, cause the one or more computers to function as:

an identification unit configured to identify a type of the sensed sheet based on a result of inputting the parameter obtained by the sensor to an estimation model obtained by machine learning using a parameter of a sheet as input data and a type of a sheet as supervised data, wherein the type of a sheet used as supervised data corresponds to the parameter of a sheet used as input data;

an input unit configured to input information corresponding to the type of the sheet which is decided as the type of the sensed sheet, the parameter of the sensed sheet being obtained by the sensor; and an execution unit configured to execute re-learning for the estimation model using the parameter obtained by the sensor, wherein if the type of the sheet identified by the identification unit and the type of the sheet represented by the information input by the input unit are different, the execution unit performs the re-learning such that the type of the sheet identified by the identification unit based on a result of inputting the parameter obtained by the sensor as the input data to the estimation model becomes the type of the sheet represented by the information input by the input unit.

2. The apparatus according to claim 1, wherein the sensor senses a sheet by illuminating the sheet with light and receiving light after the illumination.

3. The apparatus according to claim 2, wherein for the re-learning, concerning a sheet for which the type of the sheet identified by the identification unit and the type of the sheet represented by the information input by the input unit are different, the sensor illuminates a plurality of different positions with the light and obtains a plurality of parameters, and the execution unit performs the re-learning using the plurality of parameters obtained by the sensor as the input data and the type of the sheet represented by the information input by the input unit as the supervised data.

4. The apparatus according to claim 1, wherein the computer-readable instructions cause, when executed by the one or more computers, the one or more computers to further function as:

a registration unit configured to register the type of the sheet based on a user operation if a sheet of a type that is not an identification target of the identification unit is set for identification.

5. The apparatus according to claim 2, wherein the computer-readable instructions cause, when executed by the one or more computers, the one or more computers to further function as:

a registration unit configured to register the type of the sheet based on a user operation if a sheet of a type that is not an identification target of the identification unit is set for identification, wherein for the re-learning, the sensor illuminates a plurality of different positions of a sheet of the registered type with the light and obtains the plurality of parameters, and the execution unit performs the re-learning using the plurality of parameters as the input data and the registered type of the sheet as the supervised data.

6. The apparatus according to claim 1, wherein the execution unit repetitively executes the re-learning based on a magnitude of a difference between the supervised data and an output obtained when the input data is input to a learning model.

7. The apparatus according to claim 1, wherein a probability corresponding to each of a plurality of types of sheets is output as the result in the estimation model.

8. The apparatus according to claim 7, wherein the computer-readable instructions cause, when executed by the one or more computers, the one or more computers to further function as:

a display unit configured to display a screen based on the probability.

9. The apparatus according to claim 8, wherein if there exist a plurality of types of sheets for which the probability exceeds a first threshold, the identification unit displays, on the screen, the types of the sheets each having the probability exceeding the first threshold.

10. The apparatus according to claim 9, wherein if there do not exist the plurality of types of sheets for which the probability exceeds the first threshold, the identification unit displays, on the screen, a type of a sheet as an identification target of the identification unit independently of the probability.

11. The apparatus according to claim 9, wherein the computer-readable instructions cause, when executed by the one or more computers, the one or more computers to further function as:

a unit configured to accept selection of a type of a sheet by a user from the types of the sheets displayed on the screen.

12. The apparatus according to claim 7, wherein if there exists a type of a sheet for which the probability exceeds a second threshold, the identification unit outputs the type of the sheet as a result of identification.

13. The apparatus according to claim 7, wherein the identification unit outputs a type of sheet for which the probability is highest as a result of identification.

14. The apparatus according to claim 2, wherein the sensor obtains, as the parameter concerning the characteristic of the sheet, at least one of a diffused reflection component of the light with which the sheet is illuminated, a specular reflection component of the light, and a distance between the sheet and the sensor.

15. A processing method executed by an identification apparatus, comprising:

sensing, by a sensor, a sheet, thereby obtaining a parameter concerning a characteristic of the sheet;

identifying a type of the sensed sheet based on a result of inputting the parameter obtained by the sensor to an estimation model obtained by machine learning using a parameter of a sheet as input data and a type of a sheet as supervised data, wherein the type of a sheet used as supervised data corresponds to the parameter of a sheet used as input data;

inputting information corresponding to the type of the sheet which is decided as the type of the sensed sheet, the parameter of the sensed sheet being obtained by the sensor; and executing re-learning for the estimation model using the parameter obtained by the sensor, wherein if the identified type of the sheet and the type of the sheet represented by the input information are different, the re-learning is executed such that the type of the sheet identified based on a result of inputting the parameter obtained by the sensor as the input data to the estimation model becomes the type of the sheet represented by the input information.

16. The method according to claim 15, wherein the sensor senses a sheet by illuminating the sheet with light and receiving light after the illumination.

17. The method according to claim 16, wherein for the re-learning, concerning a sheet for which the identified type of the sheet and the type of the sheet represented by the input information are different, a plurality of different positions are illuminated with the light, and a plurality of parameters are obtained by the sensor, and the re-learning is performed using the plurality of parameters obtained by the sensor as the input data and the type of the sheet represented by the input information as the supervised data.

18. The method according to claim 15, further comprising:

registering the type of the sheet based on a user operation if a sheet of a type that is not an identification target is set for identification.

19. The method according to claim 16, further comprising:

registering the type of the sheet based on a user operation if a sheet of a type that is not an identification target is set for identification, wherein for the re-learning, a plurality of different positions of a sheet of the registered type are illuminated with the light, and the plurality of parameters are obtained by the sensor, and the re-learning is executed using the plurality of parameters as the input data and the registered type of the sheet as the supervised data.

20. A non-transitory computer-readable storage medium that stores a program that causes one or more computers included in an identification apparatus to execute a processing method, wherein the processing method comprises:

sensing, by a sensor, a sheet, thereby obtaining a parameter concerning a characteristic of the sheet;

identifying a type of the sensed sheet based on a result of inputting the parameter obtained by the sensor to an estimation model obtained by machine learning using a parameter of a sheet as input data and a type of a sheet as supervised data, wherein the type of a sheet used as supervised data corresponds to the parameter of a sheet used as input data;

inputting information corresponding to the type of the sheet which is decided as the type of the sensed sheet, the parameter of the sensed sheet being obtained by the sensor; and executing re-learning for the estimation model using the parameter obtained by the sensor, wherein if the identified type of the sheet and the type of the sheet represented by the input information are different, the re-learning is executed such that the type of the sheet identified based on a result of inputting the parameter obtained by the sensor as the input data to the estimation model becomes the type of the sheet represented by the input information.

* * * * *